United States Patent
de Vries

(10) Patent No.: US 9,716,609 B2
(45) Date of Patent: Jul. 25, 2017

(54) SYSTEM AND METHOD FOR TRACKING CHANGES TO FILES IN STREAMING APPLICATIONS

(75) Inventor: Jeffrey de Vries, Sunnyvale, CA (US)

(73) Assignee: Numecent Holdings, Inc., Irvine, CA (US)

( * ) Notice: Subject to any disclaimer, the term of this patent is extended or adjusted under 35 U.S.C. 154(b) by 1931 days.

(21) Appl. No.: 11/388,381

(22) Filed: Mar. 23, 2006

(65) Prior Publication Data

US 2006/0230175 A1    Oct. 12, 2006

Related U.S. Application Data

(60) Provisional application No. 60/664,765, filed on Mar. 23, 2005.

(51) Int. Cl.
   *G06F 15/16*    (2006.01)
   *H04L 29/06*    (2006.01)
(52) U.S. Cl.
   CPC ...... *H04L 29/06027* (2013.01); *H04L 65/607* (2013.01)
(58) Field of Classification Search
   CPC .................................. H04L 29/06027
   USPC .................................. 709/231, 246
   See application file for complete search history.

(56) References Cited

U.S. PATENT DOCUMENTS

| | | | |
|---|---|---|---|
| 4,796,220 A | 1/1989 | Wolfe | |
| 5,063,500 A | 11/1991 | Shorter | |
| 5,109,413 A | 4/1992 | Comeford et al. | |
| 5,210,850 A | 5/1993 | Kelly et al. | |
| 5,293,556 A | 3/1994 | Hill et al. | |
| 5,442,791 A | 8/1995 | Wrabetz et al. | |
| 5,495,411 A | 2/1996 | Ananda | |
| 5,547,202 A | 8/1996 | Tsumura | 8/96 |
| 5,548,645 A | 8/1996 | Ananda | |
| 5,652,887 A | 7/1997 | Dewey et al. | 7/97 |
| 5,666,293 A | 9/1997 | Metz et al. | |
| 5,696,965 A | 12/1997 | Dedrick | |

(Continued)

FOREIGN PATENT DOCUMENTS

EP    0 813 325 A2    12/1997
EP    0 658 837 B1    6/2000

(Continued)

OTHER PUBLICATIONS

Fiedler et al, UNIX System V, Release 4 Administration, Aug. 1991, Sams 2d edition.

(Continued)

*Primary Examiner* — Andrew Georgandellis
(74) *Attorney, Agent, or Firm* — Sheppard, Mullin, Richter & Hampton LLP

(57) ABSTRACT

A technique for modifying virtual files involves tracking changes locally. A method according to the technique may include virtually representing a file on, for example, a streaming client, and writing modifications to the virtual file into a diff-file on the streaming client. A system according the technique may include a virtual file associated with a remotely stored file, a diff-file, stored locally, associated with the remotely stored file, and a diff-file integration engine. The diff-file may include local changes to the virtual file. The diff-file integration engine may be capable of combining the virtual file with the diff-file to create a locally modified virtual file.

15 Claims, 8 Drawing Sheets

(56) References Cited

U.S. PATENT DOCUMENTS

| | | | |
|---|---|---|---|
| 5,701,427 A | 12/1997 | Lathrop | |
| 5,706,440 A | 1/1998 | Compliment et al. | |
| 5,715,403 A | 2/1998 | Stefik | |
| 5,764,906 A | 6/1998 | Edelstein et al. | |
| 5,765,152 A | 6/1998 | Erickson | 6/98 |
| 5,768,528 A | 6/1998 | Stumm | 6/98 |
| 5,768,539 A | 6/1998 | Metz et al. | 6/98 |
| 5,771,354 A | 6/1998 | Crawford | |
| 5,778,395 A | 7/1998 | Whiting et al. | |
| 5,790,753 A | 8/1998 | Krishnamoorthy et al. | 8/98 |
| 5,805,809 A | 9/1998 | Singh et al. | |
| 5,809,144 A | 9/1998 | Sirbu et al. | |
| 5,812,881 A | 9/1998 | Ku et al. | 9/98 |
| 5,818,711 A | 10/1998 | Schwabe et al. | 10/98 |
| 5,822,537 A | 10/1998 | Katseff et al. | |
| 5,835,722 A | 11/1998 | Bradshaw et al. | |
| 5,838,910 A | 11/1998 | Domenikos et al. | |
| 5,855,020 A | 12/1998 | Kirsch | 12/98 |
| 5,874,986 A | 2/1999 | Gibbon et al. | 2/99 |
| 5,878,425 A | 3/1999 | Redpath | |
| 5,881,232 A | 3/1999 | Cheng et al. | |
| 5,892,915 A | 4/1999 | Duso et al. | |
| 5,892,953 A | 4/1999 | Bhagria et al. | 4/99 |
| 5,895,454 A | 4/1999 | Harrington | |
| 5,895,471 A | 4/1999 | King et al. | 4/99 |
| 5,901,315 A | 5/1999 | Edwards et al. | 5/99 |
| 5,903,721 A | 5/1999 | Sixtus | |
| 5,903,732 A | 5/1999 | Reed et al. | |
| 5,903,892 A | 5/1999 | Hoffert et al. | |
| 5,905,868 A | 5/1999 | Baghai et al. | |
| 5,909,545 A | 6/1999 | Frese et al. | |
| 5,911,043 A | 6/1999 | Duffy et al. | |
| 5,918,015 A | 6/1999 | Suzuki et al. | |
| 5,923,885 A | 7/1999 | Johnson | |
| 5,925,126 A | 7/1999 | Hsieh | 7/99 |
| 5,929,849 A | 7/1999 | Kikinis | 7/99 |
| 5,931,907 A | 8/1999 | Davies et al. | 8/99 |
| 5,933,603 A | 8/1999 | Vahalia et al. | |
| 5,933,822 A | 8/1999 | Braden-Harder et al. | |
| 5,943,424 A | 8/1999 | Berger et al. | |
| 5,948,062 A | 9/1999 | Tzelnic et al. | |
| 5,948,065 A | 9/1999 | Eilert et al. | |
| 5,949,877 A | 9/1999 | Traw et al. | |
| 5,953,506 A | 9/1999 | Kalra et al. | |
| 5,956,717 A | 9/1999 | Kraay et al. | 9/99 |
| 5,960,411 A | 9/1999 | Hartman et al. | |
| 5,960,439 A | 9/1999 | Hammer et al. | 9/99 |
| 5,961,586 A | 10/1999 | Pedersen | 10/99 |
| 5,961,591 A | 10/1999 | Jones et al. | 10/99 |
| 5,963,444 A | 10/1999 | Shidira et al. | 10/99 |
| 5,963,944 A | 10/1999 | Admas | |
| 5,973,696 A | 10/1999 | Arganat et al. | |
| 5,987,454 A | 11/1999 | Hobbs | |
| 6,003,065 A | 12/1999 | Yan et al. | 12/99 |
| 6,003,095 A | 12/1999 | Pekowski et al. | 12/99 |
| 6,014,686 A | 1/2000 | Elnozahy et al. | |
| 6,018,619 A | 1/2000 | Allrad et al. | |
| 6,026,166 A | 2/2000 | LeBourgeois | |
| 6,028,925 A | 2/2000 | Van Berkum et al. | |
| 6,038,379 A | 3/2000 | Fletcher et al. | |
| 6,038,610 A | 3/2000 | Belfiore et al. | |
| 6,047,323 A | 4/2000 | Krause | |
| 6,049,835 A | 4/2000 | Gagnon | |
| 6,061,738 A | 5/2000 | Osaku et al. | |
| 6,065,043 A | 5/2000 | Domenikos et al. | |
| 6,076,104 A | 6/2000 | McCue | |
| 6,081,842 A | 6/2000 | Shachar et al. | |
| 6,085,186 A | 7/2000 | Christianson et al. | |
| 6,085,193 A | 7/2000 | Malkin et al. | |
| 6,088,705 A | 7/2000 | Lightstone | |
| 6,092,194 A | 7/2000 | Touboul | |
| 6,094,649 A | 7/2000 | Bowen et al. | |
| 6,099,408 A | 8/2000 | Schneier et al. | |
| 6,101,482 A | 8/2000 | DiAngelo et al. | |
| 6,101,491 A | 8/2000 | Woods | |
| 6,101,537 A | 8/2000 | Edelstein et al. | |
| 6,108,420 A | 8/2000 | Larose et al. | |
| 6,115,741 A | 9/2000 | Domenikos et al. | |
| 6,138,271 A | 10/2000 | Keeley | |
| 6,154,878 A | 11/2000 | Saboff | |
| 6,157,948 A | 12/2000 | Inoue et al. | |
| 6,173,330 B1 | 1/2001 | Guo et al. | |
| 6,185,608 B1 | 2/2001 | Hon et al. | |
| 6,192,398 B1 | 2/2001 | Hunt et al. | |
| 6,192,408 B1 | 2/2001 | Vahalia et al. | |
| 6,195,694 B1 | 2/2001 | Chen et al. | 2/1 |
| 6,212,640 B1 | 4/2001 | Abdelnur et al. | 4/1 |
| 6,219,693 B1 | 4/2001 | Napolitano et al. | |
| 6,226,665 B1 | 5/2001 | Deo et al. | |
| 6,253,234 B1 | 6/2001 | Hunt et al. | |
| 6,275,496 B1 | 8/2001 | Burns et al. | |
| 6,278,992 B1 | 8/2001 | Curtis et al. | |
| 6,282,712 B1 | 8/2001 | Davis et al. | |
| 6,298,356 B1 | 10/2001 | Jawahar et al. | |
| 6,301,605 B1 | 10/2001 | Napolitano et al. | |
| 6,311,221 B1 | 10/2001 | Raz et al. | |
| 6,330,561 B1 | 12/2001 | Cohen et al. | |
| 6,343,287 B1 | 1/2002 | Kumar et al. | 1/2 |
| 6,347,398 B1 | 2/2002 | Parthasarathy et al. | |
| 6,356,946 B1 | 3/2002 | Clegg et al. | |
| 6,356,961 B1 * | 3/2002 | Oprescu-Surcobe | 710/20 |
| 6,370,686 B1 | 4/2002 | Delo et al. | |
| 6,374,402 B1 | 4/2002 | Schmeidler et al. | |
| 6,385,596 B1 | 5/2002 | Wiser et al. | 5/2 |
| 6,389,467 B1 | 5/2002 | Eyal | 5/2 |
| 6,418,554 B1 | 7/2002 | Delo et al. | |
| 6,418,555 B2 | 7/2002 | Mohammed | |
| 6,418,556 B1 | 7/2002 | Bennington et al. | 7/2 |
| 6,424,991 B1 | 7/2002 | Gish | 7/2 |
| 6,425,017 B1 | 7/2002 | Dievendorff et al. | 7/2 |
| 6,449,688 B1 | 9/2002 | Peters et al. | |
| 6,453,334 B1 | 9/2002 | Vinson et al. | |
| 6,457,076 B1 | 9/2002 | Cheng et al. | |
| 6,508,709 B1 | 1/2003 | Karmarkar | |
| 6,510,458 B1 | 1/2003 | Berstis et al. | |
| 6,510,462 B2 | 1/2003 | Blumenau | |
| 6,510,466 B1 | 1/2003 | Cox et al. | |
| 6,524,017 B2 | 2/2003 | Lecocq et al. | 7/2 |
| 6,574,618 B2 | 6/2003 | Eylon et al. | |
| 6,584,507 B1 | 6/2003 | Bradley et al. | |
| 6,587,857 B1 | 7/2003 | Carothers et al. | |
| 6,594,682 B2 | 7/2003 | Peterson et al. | 7/3 |
| 6,598,125 B2 | 7/2003 | Romm | |
| 6,601,103 B1 | 7/2003 | Goldschmidt Iki et al. | |
| 6,601,110 B2 | 7/2003 | Marsland | 7/3 |
| 6,605,956 B2 | 8/2003 | Farnworth et al. | 8/3 |
| 6,609,114 B1 | 8/2003 | Gressel et al. | |
| 6,611,812 B2 | 8/2003 | Hurtado et al. | 8/3 |
| 6,622,137 B1 | 9/2003 | Ravid et al. | |
| 6,622,171 B2 | 9/2003 | Gupta et al. | |
| 6,636,961 B1 | 10/2003 | Braun et al. | |
| 6,687,745 B1 | 2/2004 | Franco et al. | |
| 6,694,510 B1 | 2/2004 | Williems | |
| 6,697,869 B1 | 2/2004 | Mallart et al. | |
| 6,711,619 B1 | 3/2004 | Chanderamohan et al. | |
| 6,732,179 B1 | 5/2004 | Brown et al. | 5/4 |
| 6,735,631 B1 | 5/2004 | Oekrke et al. | |
| 6,757,708 B1 | 6/2004 | Craig et al. | |
| 6,757,894 B2 | 6/2004 | Eylon et al. | |
| 6,763,370 B1 | 7/2004 | Schmeidler et al. | |
| 6,772,209 B1 | 8/2004 | Chernock et al. | |
| 6,775,779 B1 | 8/2004 | England et al. | 8/4 |
| 6,779,179 B1 | 8/2004 | Romm et al. | |
| 6,785,768 B2 | 8/2004 | Peters et al. | |
| 6,785,865 B1 | 8/2004 | Cote et al. | 8/4 |
| 6,801,507 B1 | 10/2004 | Humpleman et al. | 10/4 |
| 6,810,525 B1 | 10/2004 | Safadi et al. | |
| 6,816,909 B1 | 11/2004 | Chang et al. | |
| 6,816,950 B2 | 11/2004 | Nichols | |
| 6,832,222 B1 | 12/2004 | Zimowski | |
| 6,836,794 B1 | 12/2004 | Lucowsky et al. | |
| 6,854,009 B1 | 2/2005 | Hughes | |
| 6,891,740 B2 | 5/2005 | Williams | |
| 6,918,113 B2 | 7/2005 | Patel et al. | |

(56) References Cited

U.S. PATENT DOCUMENTS

| | | | |
|---|---|---|---|
| 6,925,495 B2* | 8/2005 | Hegde et al. | 709/223 |
| 6,938,096 B1 | 8/2005 | Greschler et al. | |
| 6,950,987 B1* | 9/2005 | Hargraves et al. | 715/207 |
| 6,959,320 B2 | 10/2005 | Shah et al. | |
| 6,970,866 B1 | 11/2005 | Pravetz et al. | 11/5 |
| 6,985,915 B2* | 1/2006 | Somalwar et al. | |
| 7,028,305 B2 | 4/2006 | Schaefer et al. | |
| 7,043,524 B2 | 5/2006 | Shah et al. | |
| 7,051,315 B2 | 5/2006 | Artiz et al. | |
| 7,062,567 B2 | 6/2006 | Benitez et al. | |
| 7,096,253 B2 | 8/2006 | Vinson et al. | 8/6 |
| 7,112,138 B2 | 9/2006 | Hendrick et al. | |
| 7,137,072 B2* | 11/2006 | Bauer et al. | 715/809 |
| 7,191,441 B2 | 3/2007 | Abbott et al. | 3/7 |
| 7,192,352 B2 | 3/2007 | Walker et al. | 3/7 |
| 7,197,516 B1 | 3/2007 | Hipp et al. | 3/7 |
| 7,246,119 B2* | 7/2007 | Kuwata et al. | 707/608 |
| 2001/0003828 A1 | 6/2001 | Peterson et al. | 7/1 |
| 2001/0014878 A1 | 8/2001 | Mitra et al. | 8/1 |
| 2001/0034736 A1 | 10/2001 | Eylon et al. | 10/1 |
| 2001/0037399 A1 | 11/2001 | Eylon et al. | |
| 2001/0037400 A1 | 11/2001 | Raz et al. | |
| 2001/0044850 A1 | 11/2001 | Raz et al. | |
| 2001/0044851 A1 | 11/2001 | Rothman et al. | 11/1 |
| 2002/0015106 A1 | 2/2002 | Taylor, Jr. | 2/2 |
| 2002/0019864 A1 | 2/2002 | Mayer | |
| 2002/0042833 A1 | 4/2002 | Hendler et al. | |
| 2002/0057893 A1 | 5/2002 | Wood et al. | 5/2 |
| 2002/0059402 A1 | 5/2002 | Belanger | 5/2 |
| 2002/0065848 A1 | 5/2002 | Walker et al. | 5/2 |
| 2002/0078170 A1 | 6/2002 | Brewer et al. | |
| 2002/0078203 A1 | 6/2002 | Greschler et al. | |
| 2002/0083183 A1 | 6/2002 | Pujare et al. | |
| 2002/0083187 A1 | 6/2002 | Sim et al. | |
| 2002/0087883 A1 | 7/2002 | Wohlgemuth et al. | |
| 2002/0138640 A1 | 9/2002 | Raz et al. | |
| 2002/0147849 A1* | 10/2002 | Wong et al. | 709/246 |
| 2002/0156911 A1 | 10/2002 | Croman et al. | |
| 2003/0004882 A1 | 1/2003 | Holler et al. | |
| 2003/0009538 A1 | 1/2003 | Shah et al. | 12/4 |
| 2003/0056112 A1 | 3/2003 | Vinson et al. | |
| 2003/0105816 A1 | 6/2003 | Goswami | 6/3 |
| 2003/0140160 A1 | 7/2003 | Raz et al. | |
| 2004/0036722 A1 | 2/2004 | Warren | 2/4 |
| 2004/0036912 A1* | 2/2004 | Liou et al. | 358/1.16 |
| 2004/0128342 A1 | 7/2004 | Maes et al. | 7/4 |
| 2004/0133657 A1 | 7/2004 | Smith et al. | |
| 2004/0230784 A1 | 11/2004 | Cohen | 12/4 |
| 2004/0230971 A1 | 11/2004 | Rachman et al. | |
| 2004/0267813 A1 | 12/2004 | Rivers-Moore et al. | 12/4 |
| 2004/0268361 A1 | 12/2004 | Schaefer | |
| 2005/0010607 A1 | 1/2005 | Parker et al. | 1/5 |
| 2005/0010670 A1 | 1/2005 | Greschler et al. | |
| 2005/0091534 A1 | 4/2005 | Nave et al. | |
| 2005/0193139 A1 | 9/2005 | Vinson et al. | |
| 2006/0010074 A1 | 1/2006 | Zeitsiff et al. | |
| 2006/0031165 A1 | 2/2006 | Nave et al. | |
| 2006/0047716 A1 | 3/2006 | Keith | 3/6 |
| 2006/0048136 A1 | 3/2006 | De Vries et al. | |
| 2006/0106770 A1 | 5/2006 | De Vries et al. | |
| 2006/0123185 A1 | 6/2006 | De Vries et al. | 6/6 |
| 2007/0038642 A1 | 2/2007 | Durgin et al. | 2/7 |
| 2007/0043550 A1 | 2/2007 | Tzruya | |
| 2007/0067435 A1 | 3/2007 | Landis et al. | 3/7 |
| 2007/0074223 A1 | 3/2007 | Lescouet et al. | 3/7 |
| 2007/0126749 A1 | 6/2007 | Tzruya et al. | 10/6 |
| 2007/0129146 A1 | 6/2007 | Tzruya et al. | 6/6 |
| 2007/0129990 A1 | 6/2007 | Tzruya et al. | 7/6 |
| 2007/0130292 A1 | 6/2007 | Tzruya et al. | 7/6 |
| 2007/0168309 A1 | 7/2007 | Tzruya et al. | 10/6 |

FOREIGN PATENT DOCUMENTS

| | | |
|---|---|---|
| EP | 1 020 824 A2 | 7/2000 |
| EP | 1 143 349 | 10/2001 |
| TW | 94140171 | 11/2005 |
| WO | WO 98/40993 A1 | 9/1998 |
| WO | WO 98/50853 A1 | 11/1998 |
| WO | WO 99/57863 A1 | 11/1999 |
| WO | WO 99/60458 A2 | 11/1999 |
| WO | WO 00/04681 | 1/2000 |
| WO | WO 00/31657 | 6/2000 |
| WO | WO 00/31672 A2 | 6/2000 |
| WO | WO 00/56028 A1 | 9/2000 |
| WO | WO 01/27805 A2 | 4/2001 |
| WO | WO 01/46856 A1 | 6/2001 |
| WO | WO 02/44840 A2 | 6/2002 |
| WO | WO US2004/028195 | 8/2004 |
| WO | WO US2005/037351 | 10/2005 |
| WO | WO US2005/041024 | 11/2005 |
| WO | WO US2006/010637 | 3/2006 |
| WO | WO US2006/010904 | 3/2006 |
| WO | WO 2006/102532 A2 | 9/2006 |
| WO | WO 2006/102621 A2 | 9/2006 |

OTHER PUBLICATIONS

Mullender et al, A Distributed Operating System for the 1990s, 1990 IEEE.

Nakayoshi et al, A Secure Private File System with Minimal Syste Administration, 1997 IEEE.

O'Mahony, Security Considerations in a Network Management Environment, Jun. 1994, IEEE.

U.S. Appl. No. 10/023,915, filed Dec. 14, 2001, De Vries et al.

U.S. Appl. No. 11/021,569, filed Dec. 22, 2004, Cover et al.

U.S. Appl. No. 11/274,442, filed Nov. 14, 2005, De Vries et al.

U.S. Appl. No. 11/371,627, filed Mar. 8, 2006, De Vries et al.

Boneh et al, An Attack on RSA Given a Small Fraction of the Private Key Bits, Advances in Cryptology—ASIACRYPT '98, Lecture Notes in Computer Science, 25-34, V.1514, Springer-Verlag Berlin Heidelberg, retrieved online on Jun. 15, 2006 at http://crypto.stanford.edu/~dabo/abstracts/bits_of_d.html.

Binto, George et al, Secure Transaction Processing in Firm Real-Time Database Systems, SIGMOD International Conference on Management of Data 1997, 462-473, V26, Issue 2, Association for Computing Machinery (ACM) Press, Tucson, Arizona, United States.

Chu, et al, Referee: Trust Management for Web Applications, Proceedings of the Sixth International World Wide Web Conference, 1997, retrieved online on Jun. 15, 2006 at http://www.si.umich.edu/~presnick/papers/Referee/www6-referee.html.

Faupel, Status of Industry Work on Signed Mobile Code, Joint European Networking Conference (JENC), May 1997, 313-1-313-8.

Mullender et al, Amoeba: A Distributed Operating System for the 1990s, Computer Magazine, May 1990, 44-53, 23(5).

Nakayoshi et al, A Secure Private File System with Minimal System Administration, Communications, Computers and Signal Processing, 1997 IEEE Pacific Rim Conference, 251-255, vol. 1.

O'Mahony, Donal, Security Considerations in a Network Management Environment, 1994, 12-17, vol. 8, IEEE, USA.

Pyarali et al, Design and Performance of an Object-Oriented Framework for High-Speed Electronic Medical Imaging, Fall 1996, Computing Systems Journal, 331-375, vol. 9 No. 4, USENIX, retrieved online on Jun. 15, 2006 at http://www.cs.wustl.edu/~schmidt/PDF/COOTS-96.pdf.

Reinhardt, Robert B., An Architectural Overview of UNIX Network Security, ARINC Research Corporation, Sep. 19, 1992, retrieved online on Jun. 15, 2006 at http://www.clusit.it/whitepapers/unixnet.pdf.

Tardo & Valente, Mobile Agent Security and Telescript, 4$^{th}$ International Conference of the IEEE Computer Society (IEEE CompCon1996), Feb. 1996.

Avi Rappaport, "Robots & Spiders & Crawlers: How Web and Intranet Search Engines Follow Links to Build Indexes", Infoseek Software, pp. 1-38 (Oct. 1999).

Gralla, Preston, Chapter 44, "Shopping on the Internet" How the Internet Works, IEEE Personal Communications, Aug. 1999, 260-67, QUE-A divison of Macmillon Computer Publishing, Millenium Edition.

(56) References Cited

OTHER PUBLICATIONS

Marvin Sirbu et al., "Netbill: An Internet Commerce System Optimized for Network-Delivered Services", *IEEE Personal Communications*, 2(4):34-39 (Aug. 1995).
Microsoft Corp., Computer Dictionary, $3^{rd}$ edition, 1997, 119 & 305, Microsoft Press.
Morrow, Brian et al., Indexing Within—The Lost Gold Within the Enetrprise: Endeavors Technology, Aug. 22, 2000, pp. 1-6.
Peter Bailey, et al., "Chart of Darkness: Mapping a Large Intranet", Dept of Computer Science, FEIT, The Australian National University, Canberra ACT 0200, Australia pp. 1-23, http://pastime.anu.edu.au/nick/pubs/www9/cod.html. (Feb. 2001).
Sergey Brin, et al., "The Anatomy of a Large-Scale Hypertextual Web Search Engine", Computer Science Department, Stanford University, Stanford, CA 94305 pp. 1-20.
Microsoft, "Understanding Universal Plug and Play", pp. 1-39, Feb. 6, 2000.

* cited by examiner

SYSTEM AND METHOD FOR TRACKING CHANGES TO FILES IN STREAMING APPLICATIONS

BACKGROUND

When streaming a software title a client is led to believe that some or all of the files associated with the streaming software title are locally available. The files actually may or may not reside on the local system. Techniques are used to trick the client into believing that all of the files are available. A description of streaming software is provided with reference to U.S. Pat. No. 6,453,334 filed on Jun. 16, 1998, which is incorporated herein by reference.

A client, believing that a file associated with a streaming title is available, may attempt to open the file. A file may be opened for read-only access, write-only access, or read/write access. In the case of read-only access, the file can be accessed according to streaming protocols. In the case of a write-only access, the file can be created locally. In the case of a read/write access, the file is downloaded, and then modified locally.

It may be desirable to use read/write access to open a file, but not download the entire file.

DETAILED DESCRIPTION

One technique for streaming software is described in the co-pending patent application Ser. No. 10/988,014 filed Nov. 11, 2004, entitled "SYSTEM AND METHOD FOR PREDICTIVE STREAMING", which is incorporated herein by reference.

Figure 1:
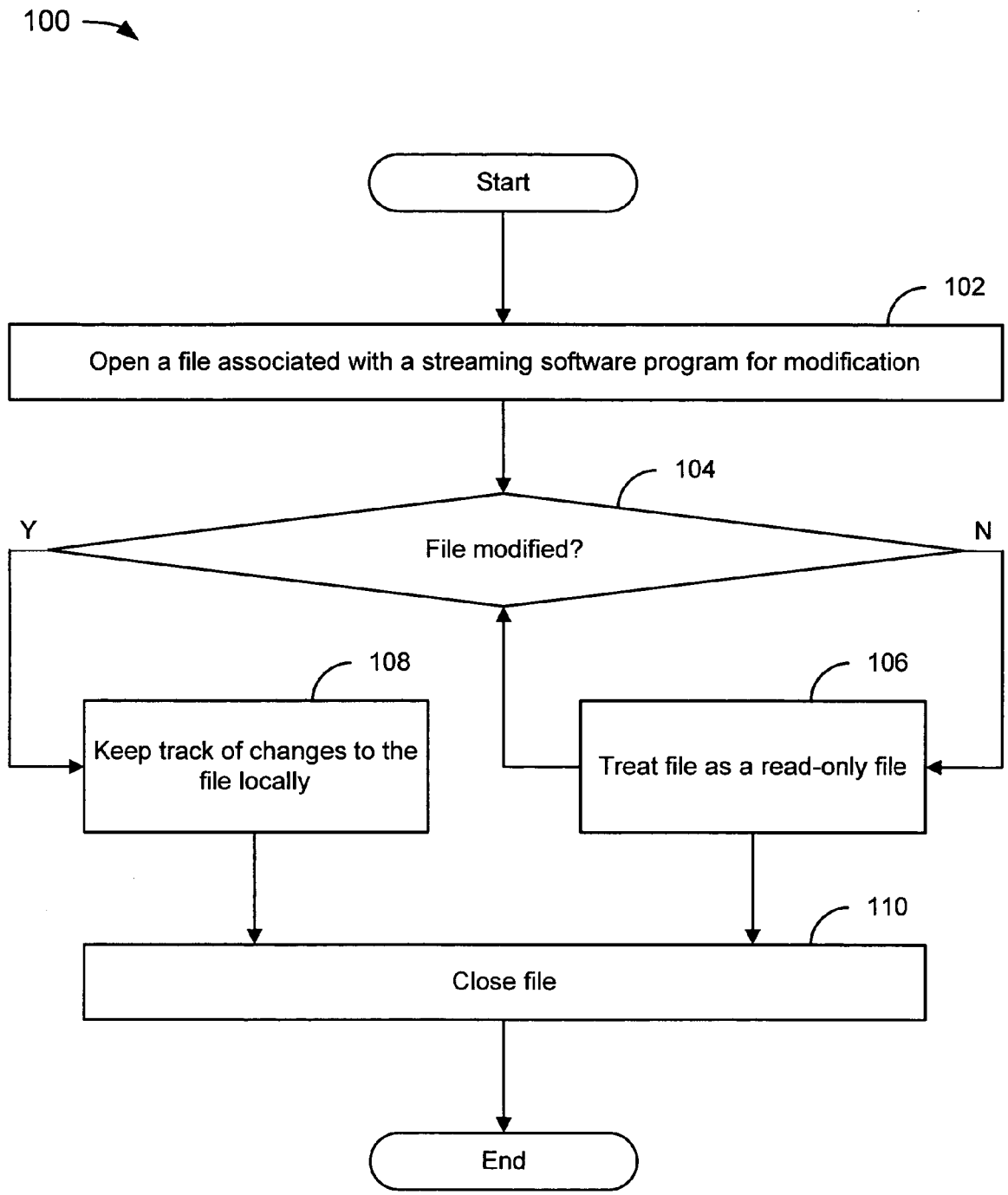
FIG. 1 depicts a flowchart of an example of a method for dealing with a read/write file in a streaming software context.

FIG. 1 depicts a flowchart 100 of an example of a method for dealing with a read/write file in a streaming software context. This method and other methods are depicted as serially arranged modules. However, modules of the methods may be reordered, or arranged for parallel execution as appropriate. The flowchart 100 starts at module 102 wherein a file associated with a streaming software program is opened for modification. Typically, files may be opened read-only, write-only, or read/write. A file that is opened read/write may be referred to as a file opened for modification. Files that may or may not be stored locally when opened may be referred to as "virtual files." Advantageously, read/write and write-only files can be virtual files by using techniques described herein.

When a file is opened write-only, the file is often a new file. For example, in a streaming context, if a client opens a file write-only, the client will typically create the new file locally. When a file is opened read-only, the file, or portions of the file may be streamed as needed. Portions of the file may also be streamed according to predicted need, as is described in the co-pending patent application Ser. No. 10/988,014 filed Nov. 11, 2004, entitled "SYSTEM AND METHOD FOR PREDICTIVE STREAMING." When a file is opened read/write, on the other hand, the file may or may not be written to. For example, a client may have the right to modify (write) a file, but have no need to modify the file.

In the example of FIG. 1, the flowchart 100 continues at decision point 104 where it is determined whether the file is written to. It has been determined that in many cases, files are opened read/write, but then treated as read-only. Advantageously, in a non-limiting embodiment, if it is determined that the file has not been written to (104-N), then the flowchart 100 continues at module 106 where the file is treated as read-only until the file is written to. The flowchart 100 ends if the file is never written to. This can reduce the need to download portions of the file in preparation for writes.

If it is determined that the file is written to (104-Y), then the flowchart 100 continues at module 108, where changes to the file are tracked locally. For example, if, according to a write procedure, a pointer seeks to a location of the file and writes at that location, then the written part will be recorded locally, along with, for example, an indication of the location of the write. In an embodiment, the locally tracked information includes by way of example but not limitation, the size of the write, the location of the write, and an end-of-file (eof) indicator. The eof indicator can be valuable when a truncating write is performed on a file. Keeping track of the size of the write is optional, since the size of the write is determinable from the size of the written data.

In the example of FIG. 1, the flowchart 100 continues at module 110, wherein the file is closed. The file may be closed at any time during execution of an associated streaming program, or when the streaming program or some other associated program ends. This is not intended to limit the method to programs that close the file, since a system could be designed that allows the file to remain open practically all the time and the techniques described herein would still be applicable. Moreover, use of the file is not necessarily limited at any stage of the flowchart 100, before, after, or between modifications.

It may be noted that no current API exists to delete from the middle of a file. Rather, what appears to be a deletion from the middle of a file is actually a truncating write. This is not intended to limit the invention in any way, since at least some embodiments of the invention would still work if an API were designed to perform a delete from the middle of a file.

Figure 2:
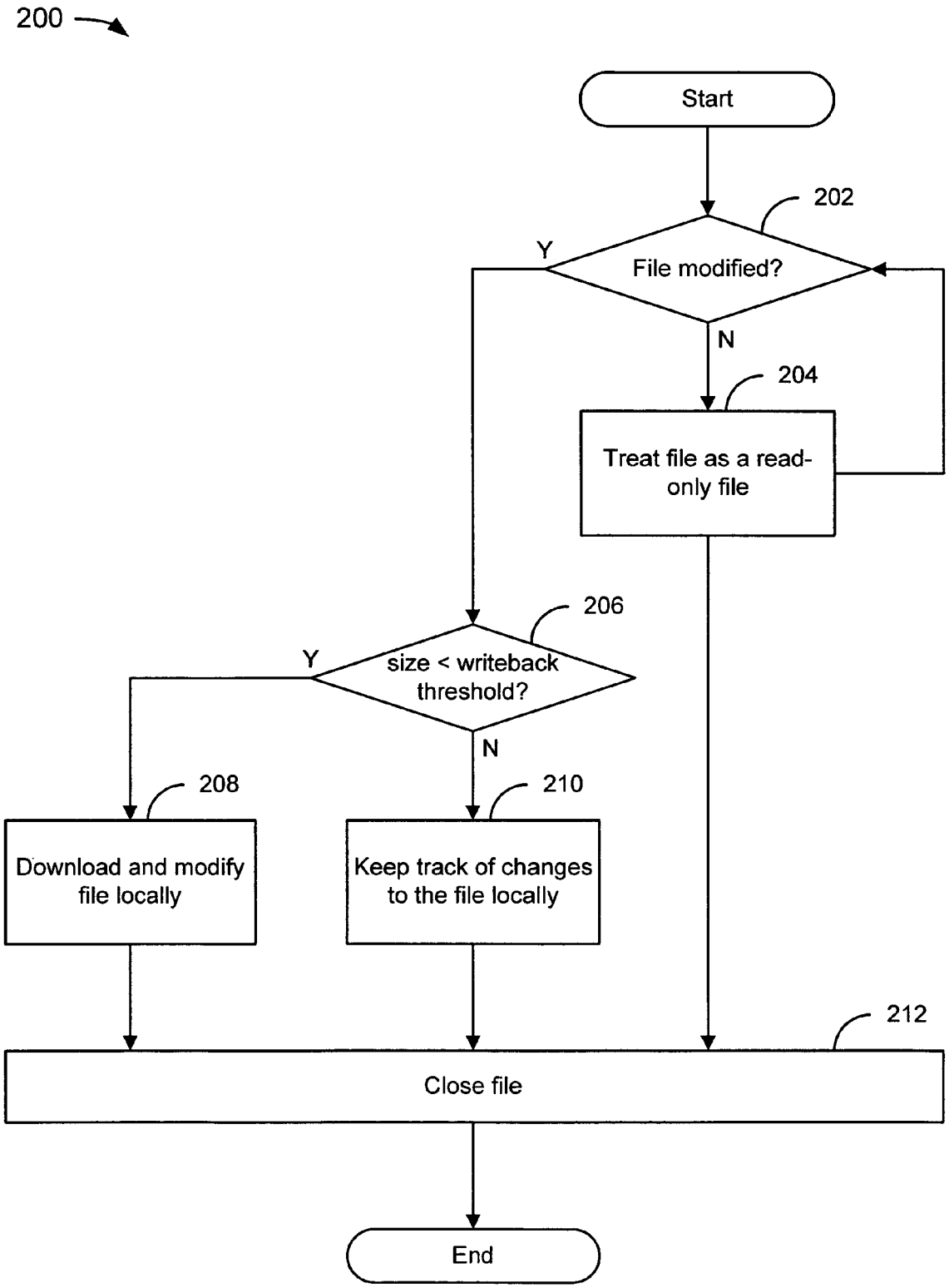
FIG. 2 depicts a flowchart of an example of a method for dealing with a read/write file in a streaming software context.

FIG. 2 depicts a flowchart 200 of an example of a method for dealing with a read/write file in a streaming software context. The flowchart 200 starts at decision point 202 where it is determined whether a file has been modified. For the purposes of this example, it is assumed that the file has been opened read/write. If the file is not modified (202-N), then the flowchart 100 continues at module 204, where the file is treated as a read-only file. In some cases, a file that is opened read/write is not modified from the time the file is opened until the file is closed (at module 212).

If, on the other hand, the file is modified (202-Y), then the flowchart 200 continues at decision point 206 where it is determined whether the size of the file is less than a writeback threshold. The writeback threshold is a value of arbitrary size that is used to determine whether it is "worth it" to keep track of changes to a file. The threshold may be set to, by way of example but not limitation, 250 KB. In some cases it may be desirable to increase or decrease this threshold depending upon such factors as local memory resources and download bandwidth.

If it is determined that the size of the file is less than the writeback threshold (206-Y), then at module 208 the file is downloaded and modified locally. If, on the other hand, it is determined that the size of the file is not less than the writeback threshold (206-N), then at module 210 changes to the file are tracked locally in lieu of downloading and modifying the file. In this way, changes to large files can be tracked locally without using up bandwidth or memory in an attempt to download the large files. In any case, the file is assumed to eventually be closed at module 212, and the flowchart 100 ends.

Figure 3:
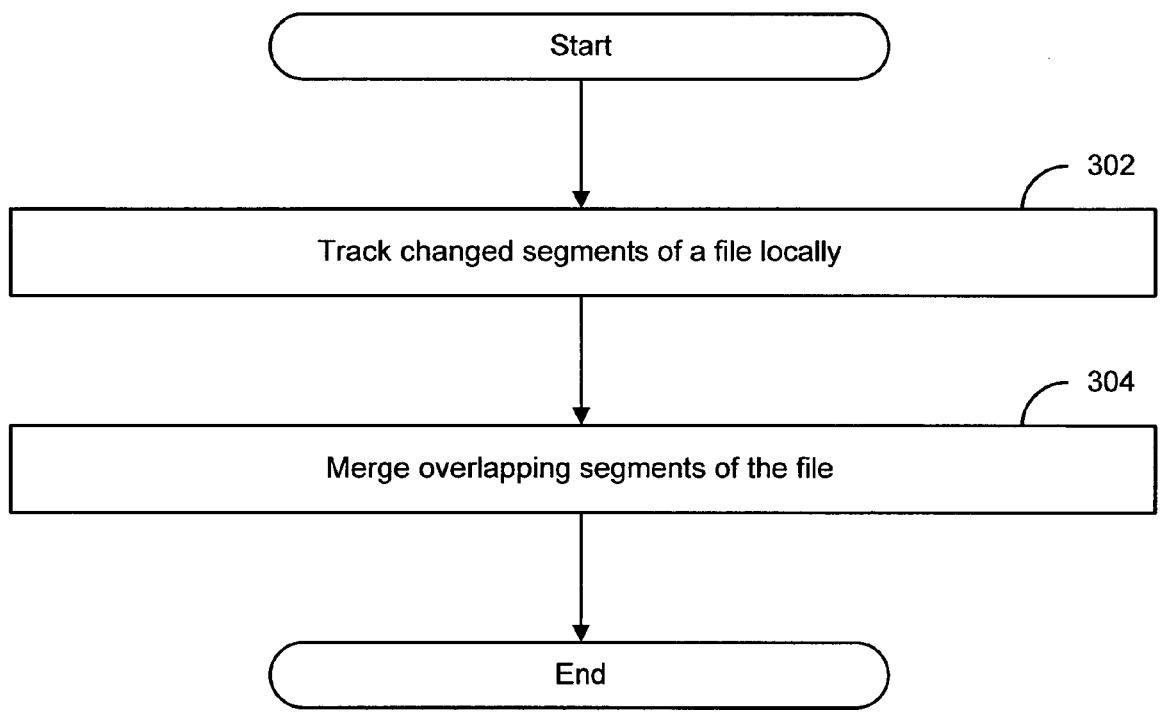
FIG. 3 depicts a flowchart of an example of a method for dealing with modified segments of a file in a streaming software context.

FIG. 3 depicts a flowchart 300 of an example of a method for dealing with modified segments of a file in a streaming software context. The flowchart 360 starts at module 302 where changes to segments of a file are tracked locally. The flowchart 300 continues at module 304 where overlapping segments of the file are merged. In a non-limiting embodiment, if the tracked changes result in changes to a segment twice, then the latest change to the segment should control. In order to save space and/or reduce the risk of error, the two changes should be merged into a single change.

The method of FIG. 3 could be incorporated into the method of FIG. 2. For example, for files that exceed a writeback threshold, segments of the file could be tracked locally, and overlapping segments could be merged. Alternatively, all files could be handled as described with reference to FIG. 3. Alternatively, the example of FIG. 3 could be applied to files that have a specified characteristic, such as, by way of example but not limitation, certain media files, token files, files associated with a certain application, etc.

Figure 4:
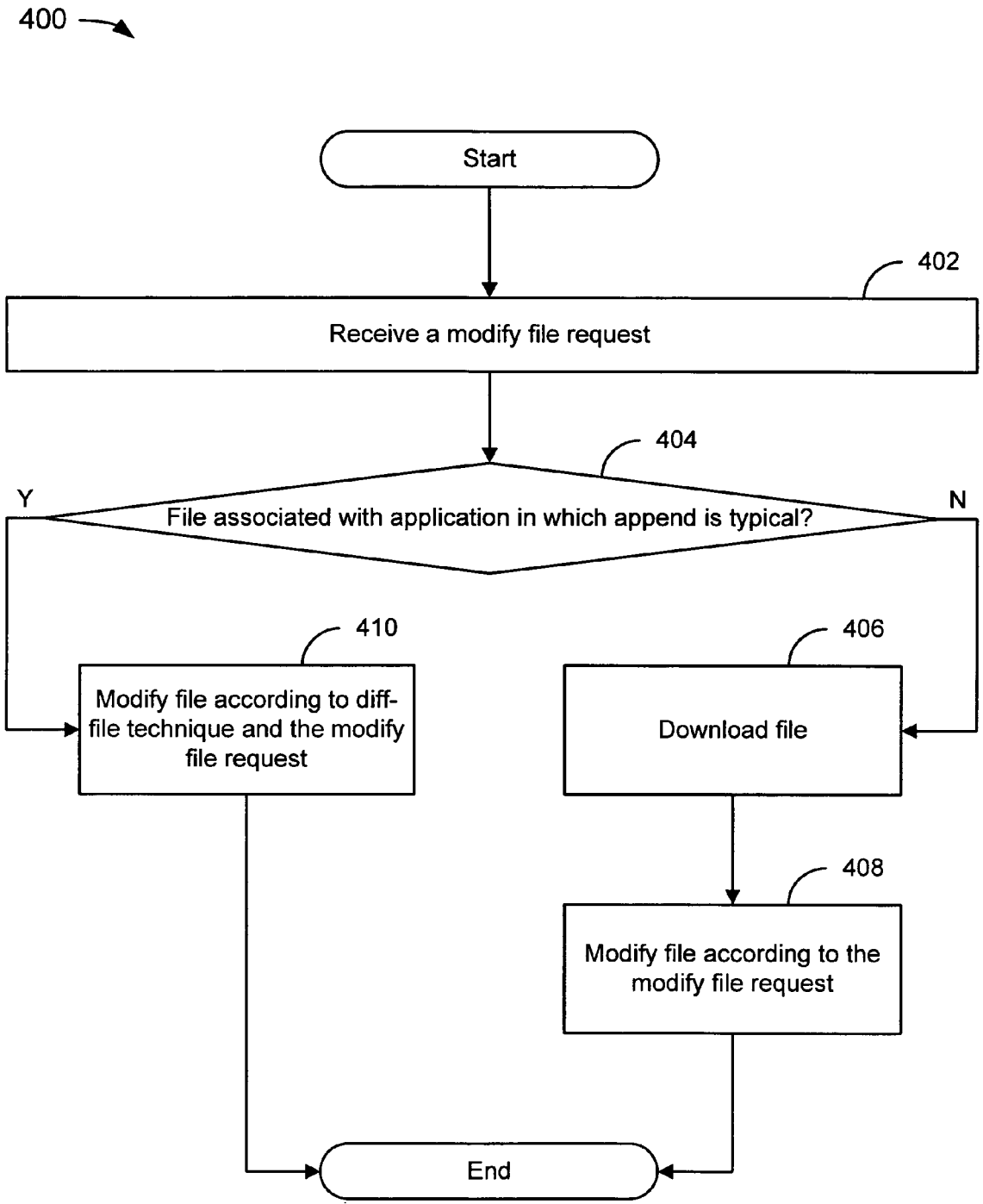
FIG. 4 depicts a flowchart of an example of a method for dealing with a modification request in a streaming software context.

FIG. 4 depicts a flowchart 400 of a method according to an embodiment. The flowchart 400 starts at module 402 where a file modify request is received. This request may follow an open read/write of the file.

In an embodiment, the flowchart 400 continues at decision point 404 where it is determined whether the file is associated with an application in which an append is typical. By way of example but not limitation, many games have data files that are modified over time. Typically, the data files include saved state. As the game progresses, additional saved state is appended to the data file. Thus, a game file may be associated with an application in which an append is typical. Other files, such as Word documents, may not typically be appended to (modifications may occur with reasonable frequency anywhere in the file). Accordingly, in some cases, it may be desirable to "turn off" the diff-file procedures.

In the example of FIG. 4, if it is determined that the file is not associated with an application in which append is typical (404-N), then at module 406 the file is downloaded, at module 408 the file is modified according to the modify file request, and the flowchart 400 ends.

If, on the other hand, it is determined that the file is associated with an application in which append is typical (404-Y), then at module 410 the file is modified according to a diff-file technique and the modify file request, then the flowchart 400 ends. The diff-file technique involves tracking changes to the file locally without downloading the file in its entirety, examples of which are provided with reference to FIGS. 1-3.

Figure 5:
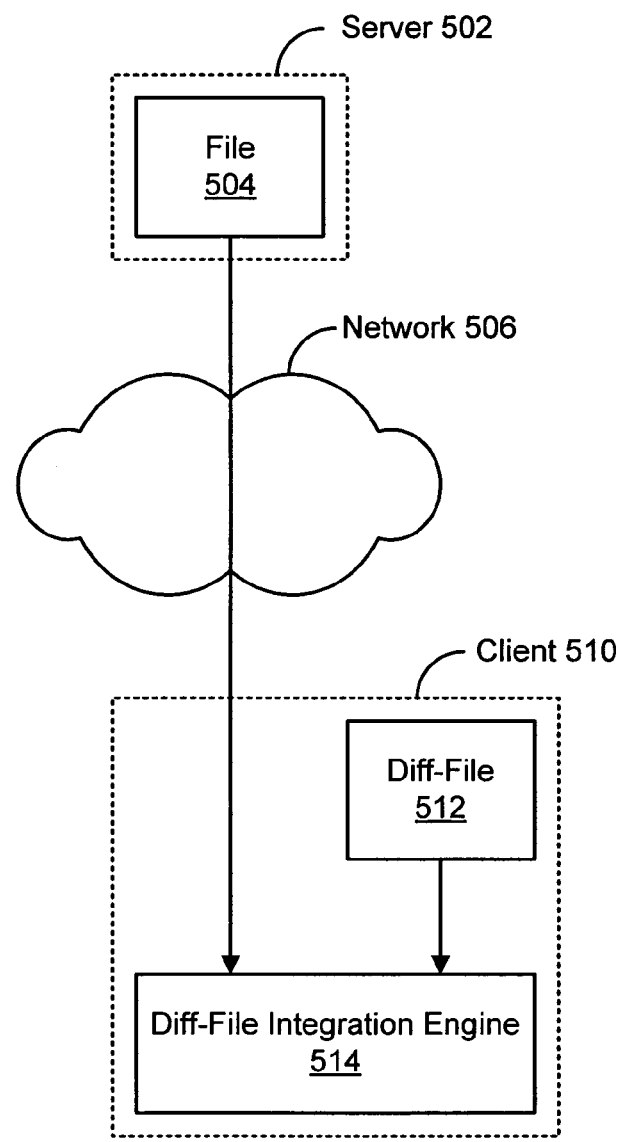
FIG. 5 depicts an example of a system 500 that includes a diff-file on a streaming client.

FIG. 5 depicts an example of a system 500 that includes a diff-file on a streaming client. The system 500 includes a server 502 with a file 504 stored thereon, a network 506, and a client 510 with a diff-file 512 and a diff-file integration engine 514 stored thereon. The server 502 and the client 510 will include other components, such as a processor, as is described later with reference to FIG. 8. In the example of FIG. 5, the server 502 may be referred to as a streaming server and the client 510 may be referred to as a streaming client in the context of a streaming software system. The diff-file 512 includes locally tracked changes to the file 504. The diff-file integration engine 514 combines the file 504 and the diff-file 512 in such a way that the file 504, modified as indicated in the diff-file 512, appears to reside locally on the client 502.

It should be noted that the file 504 may be referred to as a virtual file on the client 504. That means the client 502 includes one or more of a virtual environment in which to execute the file 504, registry information that has been spoofed to trick the client 502 into believing the file 504 is stored locally, or some other mechanism that makes the client 502 pretend that the file 504 is stored locally when it is not. Moreover, the file 504 could eventually be stored locally. For example, the file 504 might initially not be stored locally, but over time the client 502 might download some or all of the file 504 in, for example, streamed blocks. As used herein, the file 504 is referred to as a virtual file if it is capable of being a virtual file, even if it is eventually stored local to the client.

Figure 6:
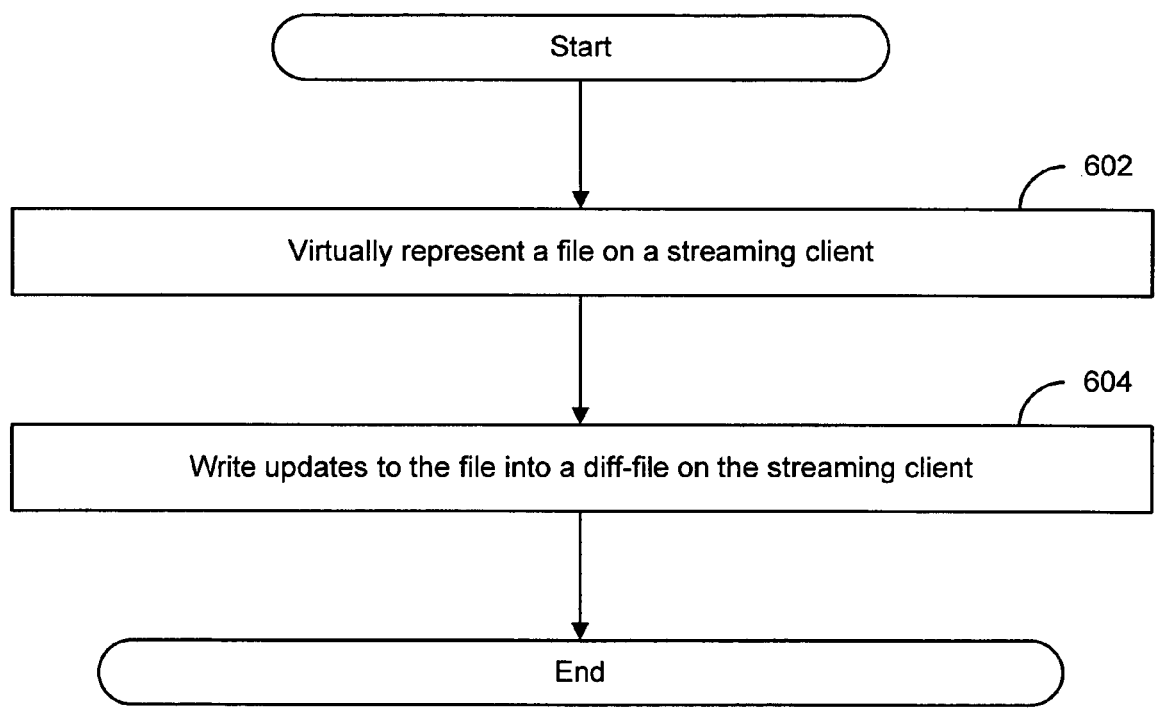
FIG. 6 depicts a flowchart 600 of an example of a method for virtually representing a file on a client with local modifications.

FIG. 6 depicts a flowchart 600 of an example of a method for virtually representing a file on a client with local modifications. The flowchart 600 starts at module 602 wherein a file is virtually represented on a streaming client. The virtual representation of a file on a streaming client may involve modifying a system registry, or presenting the file in a virtual environment. A file that is represented virtually need not actually exist on the streaming client. This is typical of streaming software applications, and allows the streamed applications to be executed locally without downloading the application in its entirety, and without installing the application.

In the example of FIG. 6, the flowchart 600 continues at module 604 wherein updates to the file are written to a diff-file on the streaming client. In this way, even though the file has not been downloaded to the streaming client, and the streamed file remains unchanged at a server, the file can be "virtually modified" by tracking changes that would have been made to the file if the file were stored locally.

Figure 7:
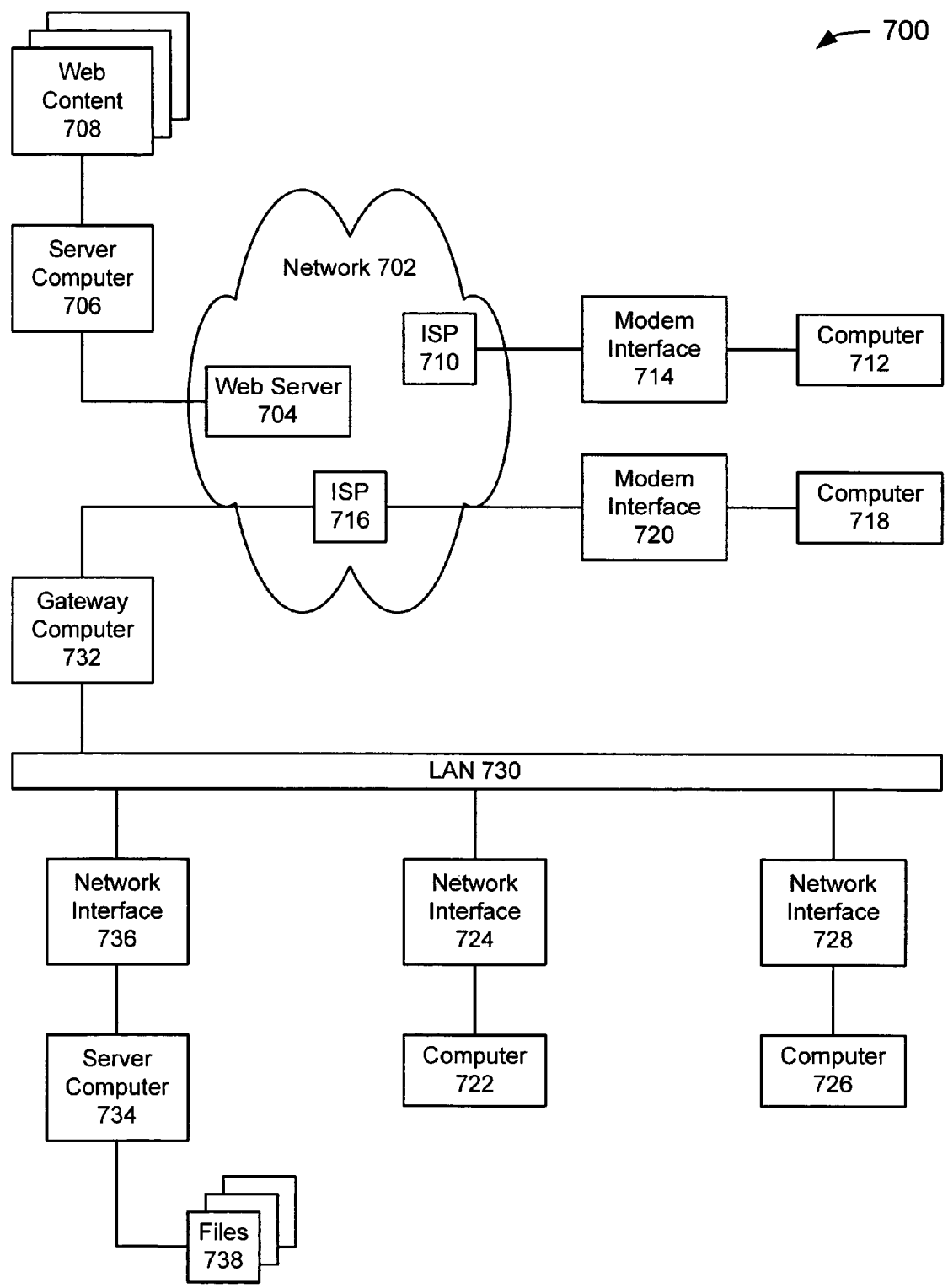
FIG. 7 depicts a networked system for use in an embodiment.
Figure 8:
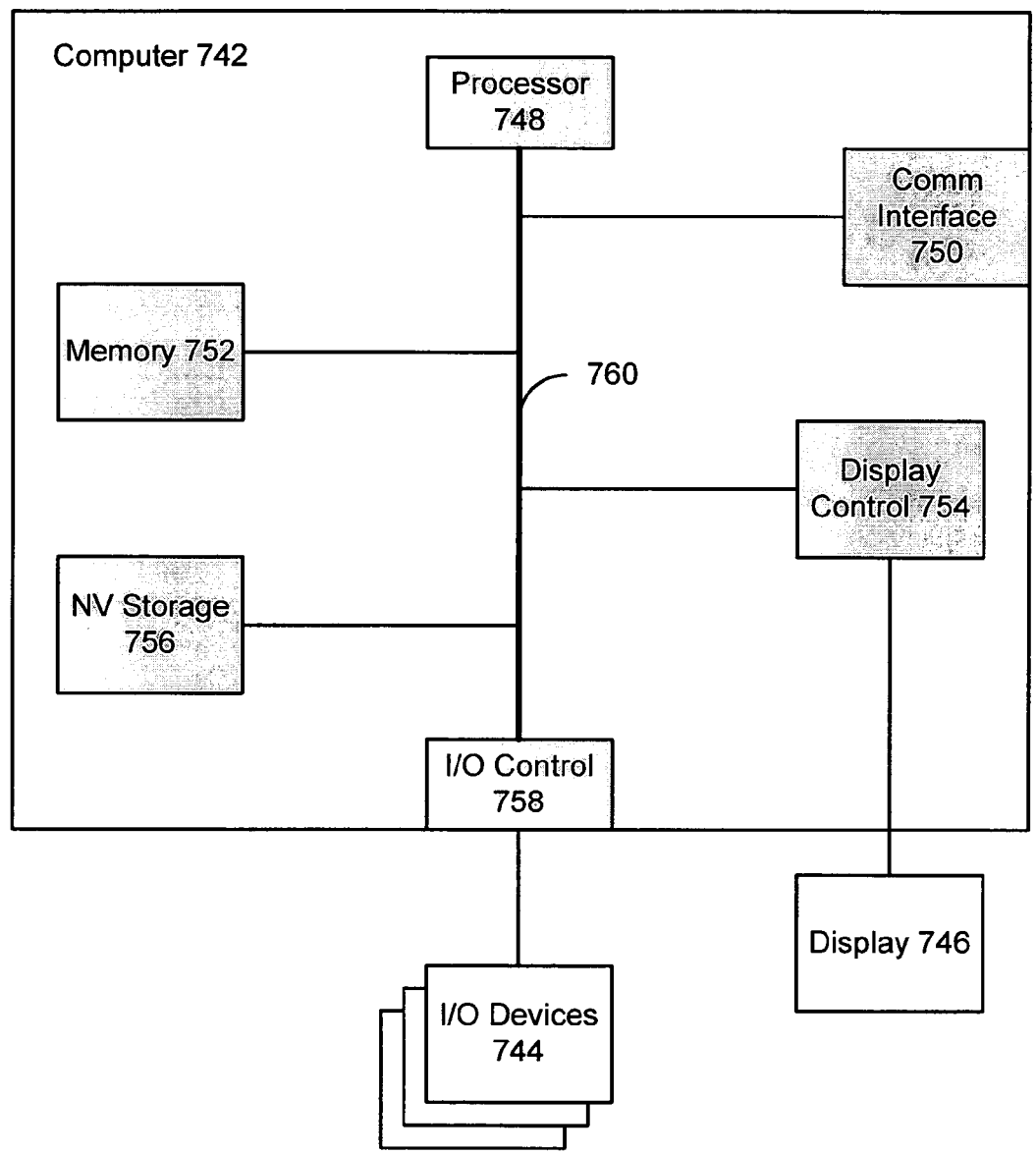
FIG. 8 depicts a computer system for use in the system of FIG. 7.

The following description of FIGS. 7 and 8 is intended to provide an overview of computer hardware and other operating components suitable for performing the methods of the invention described herein, but is not intended to limit the applicable environments. Similarly, the computer hardware and other operating components may be suitable as part of the apparatuses of the invention described herein. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 depicts a networked system 700 that includes several computer systems coupled together through a network 702, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server 704 is typically at least one computer system which operates as a server computer system and is configured to operate with the protocols of the world wide web and is coupled to the Internet. The web server system 704 can be a conventional server computer system. Optionally, the web server 704 can be part of an ISP which provides access to the Internet for client systems. The web server 704 is shown coupled to the server computer system 706 which itself is coupled to web content 708, which can be considered a form of a media database. While two computer systems 704 and 706 are shown in FIG. 7, the web server system 704 and the server computer system 706 can be one computer system having different software components providing the web server functionality and the server functionality provided by the server computer system 706, which will be described further below.

Access to the network 702 is typically provided by Internet service providers (ISPs), such as the ISPs 710 and 716. Users on client systems, such as client computer systems 712, 718, 722, and 726 obtain access to the Internet through the ISPs 710 and 716. Access to the Internet allows users of the client computer systems to exchange information, receive and send e-mails, and view documents, such as documents which have been prepared in the HTML format. These documents are often provided by web servers, such as web server 704, which are referred to as being "on" the Internet. Often these web servers are provided by the ISPs, such as ISP 710, although a computer system can be set up and connected to the Internet without that system also being an ISP.

Client computer systems 712, 718, 722, and 726 can each, with the appropriate web browsing software, view HTML pages provided by the web server 704. The ISP 710 provides Internet connectivity to the client computer system 712 through the modem interface 714, which can be considered part of the client computer system 712. The client computer system can be a personal computer system, a network computer, a web TV system, or other computer system. While FIG. 7 shows the modem interface 714 generically as a "modem," the interface can be an analog modem, isdn modem, cable modem, satellite transmission interface (e.g. "direct PC"), or other interface for coupling a computer system to other computer systems.

Similar to the ISP 714, the ISP 716 provides Internet connectivity for client systems 718, 722, and 726, although as shown in FIG. 7, the connections are not the same for these three computer systems. Client computer system 718 is coupled through a modem interface 720 while client computer systems 722 and 726 are part of a LAN 730.

Client computer systems 722 and 726 are coupled to the LAN 730 through network interfaces 724 and 728, which can be Ethernet network or other network interfaces. The LAN 730 is also coupled to a gateway computer system 732 which can provide firewall and other Internet-related services for the local area network. This gateway computer system 732 is coupled to the ISP 716 to provide Internet connectivity to the client computer systems 722 and 726. The gateway computer system 732 can be a conventional server computer system.

Alternatively, a server computer system 734 can be directly coupled to the LAN 730 through a network interface 736 to provide files 738 and other services to the clients 722 and 726, without the need to connect to the Internet through the gateway system 732.

FIG. 8 depicts a computer system 740 for use in the system 700 (FIG. 7). The computer system 740 may be a conventional computer system that can be used as a client computer system or a server computer system or as a web server system. Such a computer system can be used to perform many of the functions of an Internet service provider, such as ISP 710 (FIG. 7).

In the example of FIG. 8, the computer system 740 includes a computer 742, I/O devices 744, and a display device 746. The computer 742 includes a processor 748, a communications interface 750, memory 752, display controller 754, non-volatile storage 756, and I/O controller 758. The computer system 740 may be couple to or include the I/O devices 744 and display device 746.

The computer 742 interfaces to external systems through the communications interface 750, which may include a modem or network interface. It will be appreciated that the communications interface 750 can be considered to be part of the computer system 740 or a part of the computer 742. The communications interface can be an analog modem, isdn modem, cable modem, token ring interface, satellite transmission interface (e.g. "direct PC"), or other interfaces for coupling a computer system to other computer systems.

The processor 748 may be, for example, a conventional microprocessor such as an Intel Pentium microprocessor or Motorola power PC microprocessor. The memory 752 is coupled to the processor 748 by a bus 760. The memory 752 can be dynamic random access memory (DRAM) and can also include static ram (SRAM). The bus 760 couples the processor 748 to the memory 752, also to the non-volatile storage 756, to the display controller 754, and to the I/O controller 758.

The I/O devices 744 can include a keyboard, disk drives, printers, a scanner, and other input and output devices, including a mouse or other pointing device. The display controller 754 may control in the conventional manner a display on the display device 746, which can be, for example, a cathode ray tube (CRT) or liquid crystal display (LCD). The display controller 754 and the I/O controller 758 can be implemented with conventional well known technology.

The non-volatile storage 756 is often a magnetic hard disk, an optical disk, or another form of storage for large amounts of data. Some of this data is often written, by a direct memory access process, into memory 752 during execution of software in the computer 742. One of skill in the art will immediately recognize that the terms "machine-readable medium" or "computer-readable medium" includes any type of physical storage device that is accessible by the processor 748.

Objects, methods, inline caches, cache states and other object-oriented components may be stored in the non-volatile storage 756, or written into memory 752 during execution of, for example, an object-oriented software program. In this way, the components illustrated in, for example, FIGS. 1-3 and 6 can be instantiated on the computer system 740.

The computer system 740 is one example of many possible computer systems which have different architectures.

For example, personal computers based on an Intel microprocessor often have multiple buses, one of which can be an I/O bus for the peripherals and one that directly connects the processor 748 and the memory 752 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 752 for execution by the processor 748. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 740 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 756 and causes the processor 748 to execute the various acts required by the operating system to input and output data and to store data in memory, including storing files on the non-volatile storage 756.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the present invention is not described with reference to any particular programming language, and various embodiments may thus be implemented using a variety of programming languages.

While this invention has been described in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention; the invention is limited only by the claims.

What is claimed is:
1. A method, comprising:
virtually representing a file associated with a streaming software program on a streaming client;
streaming a segment of the file to the streaming client;
if the size of the file is greater than a writeback threshold:
tracking modifications to the segment of the file at the streaming client;
writing, at the streaming client, tracked modifications to the file into a diff-file, the diff-file residing on the streaming client;
combining, at the streaming client, the segment of the file with the diff-file to create a locally modified virtual file;
virtually representing, on the streaming client, the locally modified virtual file;
if the size of the file is less than the writeback threshold:
downloading a downloadable file having content corresponding to content of the segment of the file;
modifying the downloadable file locally.

2. The method of claim 1, further comprising merging overlapping segments of the file.

3. The method of claim 1, further comprising: receiving, at the streaming client, a modify file request; if the file comprises a document file: downloading the document file; modifying the document file according to the modify file request.

4. The method of claim 1, further comprising: receiving a modify file request; modifying the file according to a diff-file technique and the modify file request if the file is a game file; if the file is a document file: downloading the file and modifying the file according to the modify file request.

5. A method comprising:
opening for modification a segment of a file, the file being associated with a streaming software program and represented virtually on a streaming client;
streaming the segment of the file to the streaming client;
treating the file as a read-only file until a modification is received;
receiving, at the streaming client, a modification to the segment of the file;
if the size of the file is greater than a writeback threshold:
storing the modification in a local file, on the streaming client;
integrating, at the streaming client, the modification into the segment of the file when the file is used, the integrating creating a modified virtual file on the streaming client;
if the size of the file is less than the writeback threshold:
downloading a downloadable file having content corresponding to content of the segment of the file;
modifying the downloadable file locally.

6. The method of claim 5, further comprising merging overlapping segments of the file.

7. The method of claim 5, further comprising: receiving, at the streaming client, a modify file request; modifying, at the streaming client, the segment of the file according to a diff-file technique and the modify file request.

8. The method of claim 5, further comprising: receiving, at the streaming client, a modify file request; if the file comprises a document file: downloading the document file; modifying the downloaded document file according to the modify file request.

9. The method of claim 5, further comprising: receiving a modify file request; modifying the file according to a diff-file technique and the modify file request if the file is a game file; if the file is a document file: downloading the file and modifying the downloaded file according to the modify file request.

10. A system, comprising:
a remotely stored file associated with a streaming software program represented virtually on a streaming client;
if the size of the remotely stored file is greater than a writeback threshold:
a diff-file, stored on the streaming client in a non-transitory computer-readable storage medium, that includes local changes to a segment of the remotely stored file, the segment of the remotely stored file streamed to the streaming client;
a diff-file integration engine, including a processor and memory, that, in operation, combines the segment of the remotely stored file with the diff-file to create a locally modified virtual file on the streaming client;
if the size of the remotely stored file is less than the writeback threshold:
a means for downloading a downloadable file having content corresponding to content of the segment of the remotely stored file;
a means for modifying the downloadable file locally.

11. The system of claim 10, wherein the diff-file is further used to merge overlapping segments of the remotely stored file.

12. The system of claim 10, further comprising a means for receiving a modify file request, wherein the diff-file integration engine modifies the segment of the remotely stored file according to a diff-file technique and the modify file request.

13. The system of claim 10, further comprising:
a means for receiving, at the streaming client, a modify file request;
a means for downloading a document file if the file comprises the document file;
a means for modifying the downloaded document file according to the modify file request.

14. The system of claim 10, further comprising: memory having a plurality of modules stored therein;
a processor, coupled to the memory, capable of executing the executable modules, wherein the memory includes the remotely stored file, the diff-file, and the diff-file integration engine.

15. The system of claim 10, further comprising a means for receiving a modify file request, wherein the diff-file integration engine modifies the remotely stored file according to a diff-file technique and the modify file request, if the remotely stored file is a game file.

* * * * *